Nov. 16, 1971  E. H. NATSCHKE  3,620,098
HIGH POWER HAND BRAKE AND CHAIN STOP THEREFOR
Filed July 6, 1970  3 Sheets-Sheet 1

INVENTOR
ELDRED H. NATSCHKE
BY Mann, Brown, M Williams & Bradway
ATT'YS.

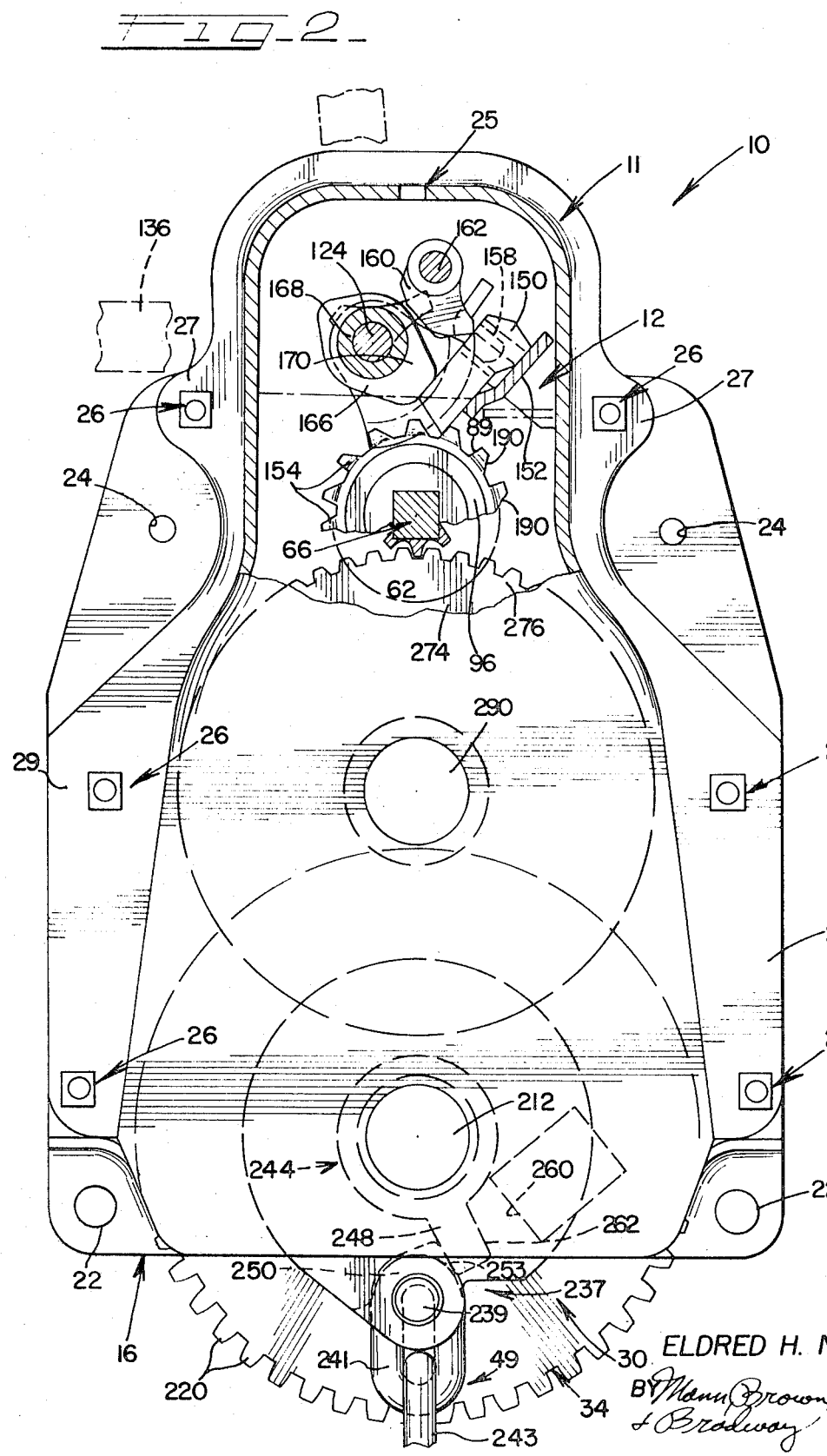

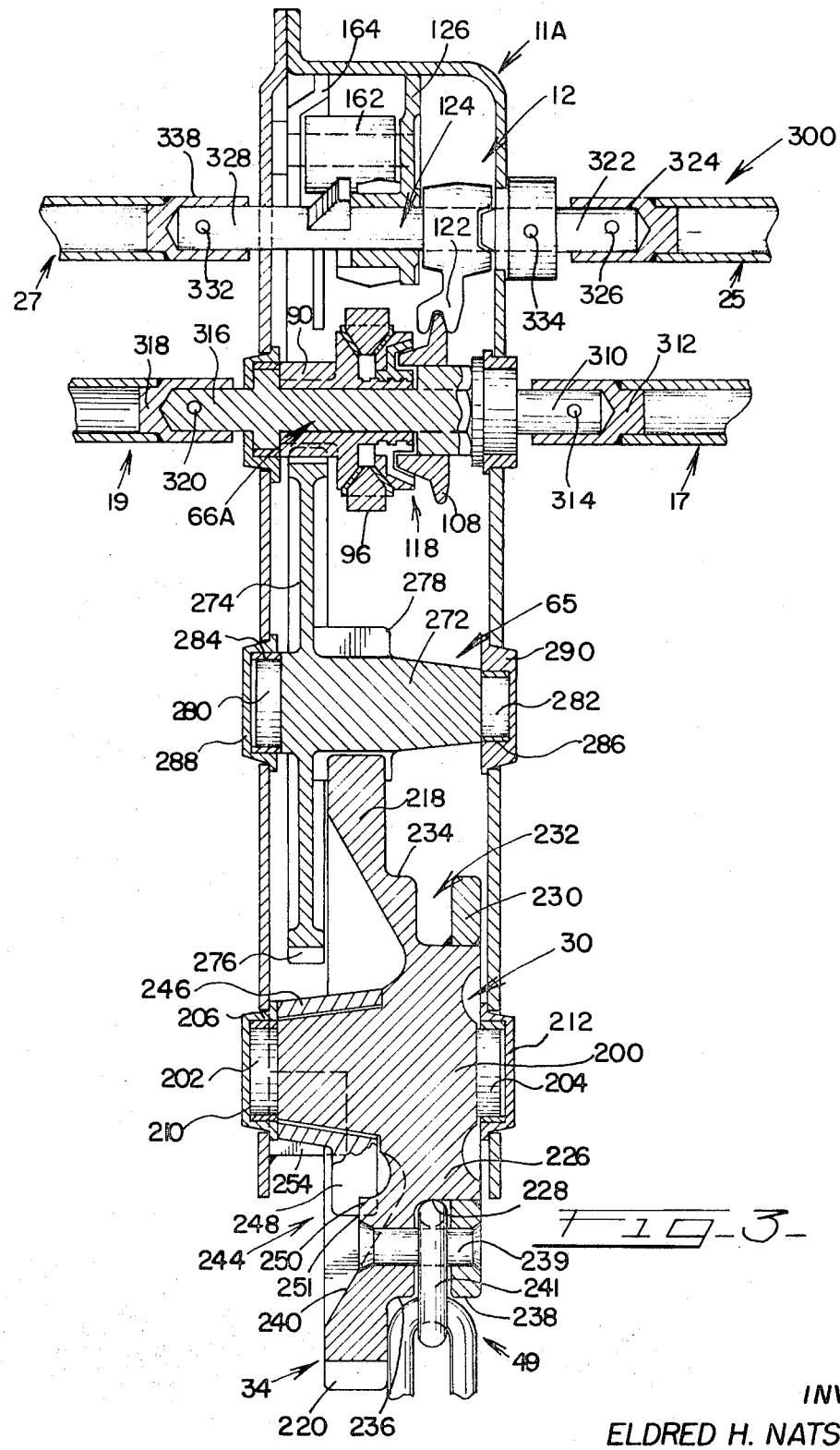

United States Patent Office 3,620,098
Patented Nov. 16, 1971

3,620,098
HIGH POWER HAND BRAKE AND CHAIN STOP THEREFOR
Eldred H. Natschke, Bourbonnais, Ill., assignor to Universal Railway Devices Company
Filed July 6, 1970, Ser. No. 52,536
Int. Cl. G05g 1/08
U.S. Cl. 74—505    9 Claims

ABSTRACT OF THE DISCLOSURE

A vertical wheel hand brake which is especially arranged to provide the increased power needed for 125 ton cars and up in weight and which includes a special gear cluster interposed between the brake drum gear and ratchet wheel pinion for this purpose. The hand brake also includes a brake chain stop arrangement that avoids winding up of the brake chain in the wrong direction, and limits overtravel of the drum on release of the brake.

---

This invention relates to a vertical wheel hand brake for railroad cars, and more particularly to improvements in hand brake arrangements of the type shown in U.S. Pats. 2,848,083 and 3,390,590.

The recent trend towards larger capacity freight cars has required that there be available hand brake equipment that is capable of accommodating cars of 125 tons and up. This involves operational requirements that are not available in conventional hand brakes.

A principal object of this invention is to provide an improved hand brake arrangement that is especially suited for cars of 125 tons and up in size.

An important requirement for hand brakes in general and high power hand brakes in particular is that they be arranged so that the operator cannot wind up the brake chain in the wrong direction.

Another principal object of this invention is to provide a chain stop for hand brakes which precludes winding up of the brake chain in the wrong direction while still permitting the drum to be rotated in excess of 360 degrees of rotation for chain windup.

Other objects of the invention are to provide a single wind drum arrangement for high power hand brakes, to provide a chain stop that is of general application to hand brakes, and to provide a high power hand brake that is economical of manufacture, convenient to install and use, and long lived and trouble free in operation.

In accordance with this invention, an intermediate gear cluster unit is interposed between the operating shaft pinion and the brake drum gear of the hand brake, and the brake drum is arranged to provide an average of at least 6250 pounds of force after the first four inches of winding, and up to 26 inches of winding. A chain stop is provided which comprises a swingably mounted stop arm journaled on the brake drum hub and operating to engage a stock block carried by the housing when the stop arm is engaged by a lug or protuberance that is carried by the drum. The lug is positioned to bypass the stop block on winding up of the chain, with the stop arm being disposed in an out of the way position, but on release of the brake, the drum lug engages the stop arm which in turn is brought into engagement with the stop block to limit brake drum overtravel on release. This same arrangement operates in a similar manner to preclude winding up of the brake chain in the wrong direction.

Other objects, uses, and advantages will be obvious or become apparent from a consideration of the following detailed description and the application drawings.

In the drawings:

FIG. 2 is a front elevational view of the hand brake shown in FIG. 1, with parts broken away to expose other parts, and with the hand brake release handle being partially shown in its two operating positions in broken lines; and FIG. 3 is a view similar to that of FIG. 1 illustrating the improvements of this invention applied to a hand brake of the under the car application type.

Figure 1:
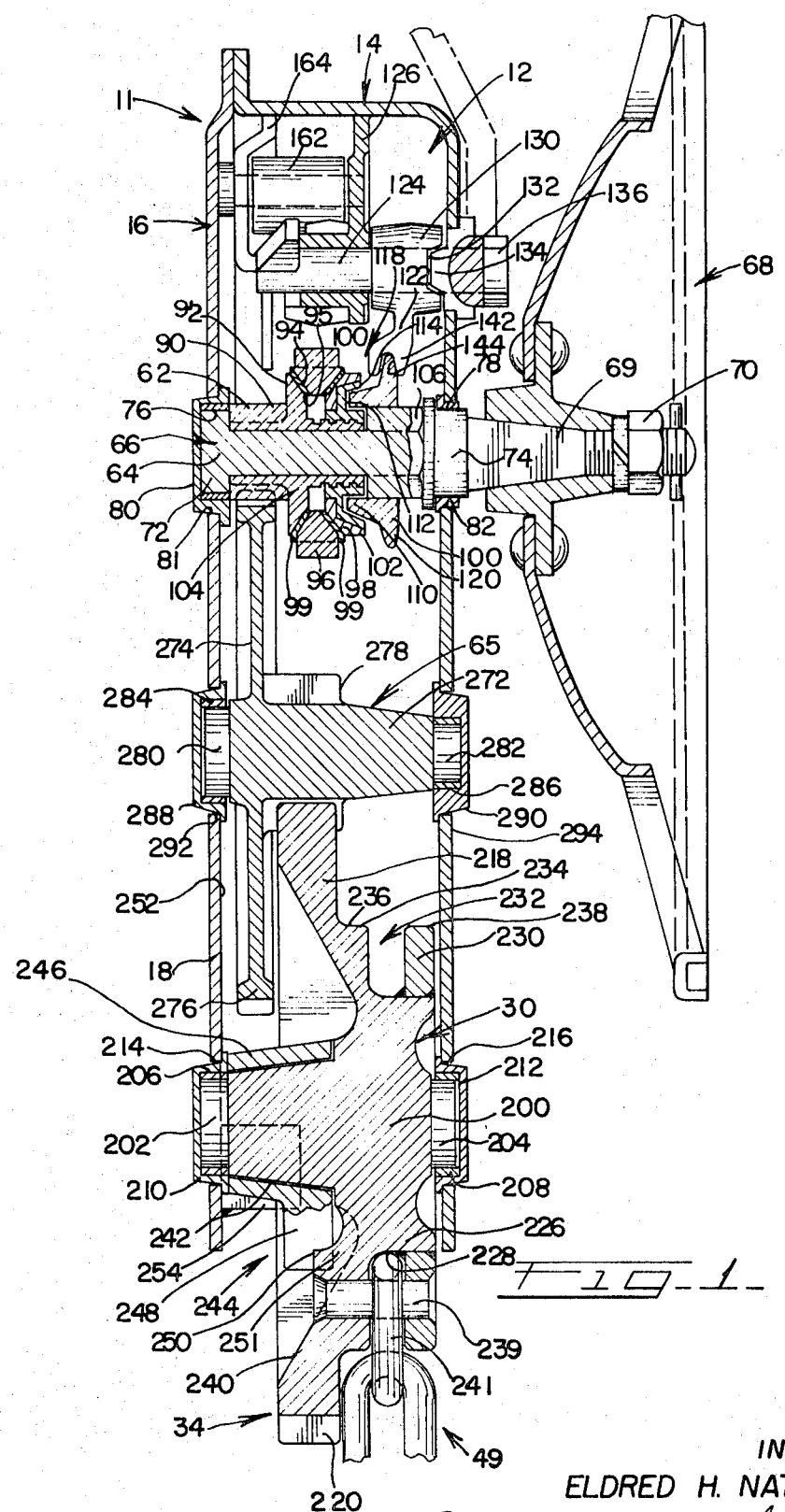
FIG. 1 is a vertical sectional view of a vertical hand wheel type hand brake in which the improvements of my invention have been embodied, with some parts shown in elevation, and with the brake shown with the chain unwound and in condition for winding the chain on the brake drum.

However, it is to be understood that the specific drawing illustrations provided are supplied primarily to comply with the requirements of the Patent Code, and that the invention may have other specific embodiments that will be obvious to those skilled in the art.

Reference numeral 10 of FIGS. 1 and 2 indicates one embodiment of the invention in the form of a vertical hand wheel hand brake positioned as it would be applied to a railroad car, in which the brake operating mechanism is indicated at 12 and is contained in a housing 11. While reference may be had to Natschke and Macku Patent 3,390,590 for the specifics of a hand brake operating mechanism of the type illustrated, the hand brake details will be described to some extent herein to insure a complete understanding of the structural features involved.

The housing is in two sections comprising a front casing 14 and a back section or attaching plate 16 defining a body portion 18 formed with a pair of lower attaching bolt holes 22 and a pair of upper attaching bolt holes 24; bolt holes 22 and 24 are adapted to receive appropriate attachment bolts or the like to secure the back plate or section to the car in a suitable conventional manner.

The front casing 14 includes a suitable oil cap indicated at 25 in FIG. 2 and is secured to the back section or attaching plate by appropriate bolts indicated at 26 that respectively pass through the respective suitable flange enlargements 27 and 29 of the front casing. The major portion of the brake operating mechanism is mounted within this casing and in such a manner as to be removable with it.

The brake operating mechanism 12 includes brake drum 30 to which is attached brake chain 49, a drum gear 34 that, in accordance with this invention, meshes with power multiplying gear cluster 65 that in turn meshes with a pinion 62 journaled on a reduced portion 64 of operating shaft 66 to which the hand wheel 68 is suitably keyed. In the form shown, the operating shaft 66 is formed with an outwardly extending tapered portion 69 of square section on which the hand wheel 68 is received and against which the hand wheel 68 is clamped by appropriate nut 70 or other suitable restraining means.

The operating shaft 66 includes the enlarged portions 72 and 74 (FIG. 1) which are respectively journaled in brass bushing 76 and phosphorus bronze bushing 78 received in the housing casing and back plate, respectively.

The brass bushing sleeve 76 is received in a dished bearing retainer 80 that is received in opening 81 of the attaching plate 16, while bushing 78 is applied directly to an opening 82 of housing section 14 by being pressed directly into same.

As indicated in FIG. 1, the pinion 62 comprises a gear portion 90 and a clutch collar portion 92 formed with a conical friction face 94 that is intended to cooperate with a similarly formed friction face 95 of ratchet wheel 96. The other side of the ratchet wheel 96 is formed with a similar friction face 98 that is intended to cooperate with friction face 100 of nut 102 that is threadedly mounted on a threaded portion 104 of pinion 62. In the form illustrated, friction surfaces 94 and 95, and 98 and 100, are separated by annular brass cone members 99 that complement the respective surfaces they are between and are free to float with respect thereto.

Operating shaft 66 is formed with a hex shaped portion 106 on which is slidably mounted a jaw clutch sleeve 108 provided with jaws 110 that are proportioned and spaced to fit into recesses 112 formed in the face 114 of nut 102 which define cooperating teeth of the nut that complete the tooth or jaw clutch between the operating shaft 66 and the nut 102 that is generally indicated at 118.

The clutch sleeve 108 is provided with a radial flange 120 which is engaged by a grooved cam member 122 keyed to release handle shaft 124 that is journaled between the casing 14 and a bracket plate 126 which is suitably mounted therein. Cam member 122 includes a hub portion 130 that is received over the shaft 124 and is formed with spaced indentations 132 that receive the similarly spaced projections 133 of the hub portion 134 of release handle 136 that is affixed to shaft 124 in any suitable manner.

The cam member 122 is formed with a rim portion 142 defining a camming groove 144 in which the radial flange 120 of the clutch sleeve 108 is mounted. The camming groove 144 is given the configuration that will move the teeth 110 of clutch sleeve 108 from recesses 112 of nut 102 as release handle 136 is moved from the lower broken line position of FIG. 2 to the upper line position of that figure (the latter is the full brake release position).

Also controlled by the release handle 136 is a pawl 150 (see FIG. 2) that is slidably mounted on support plate 152 affixed to the bracket plate 126 in any suitable manner, which pawl 150 engages in the teeth 154 of ratchet wheel 96. Pawl 150 is provided with an opening in which is received the end 158 of operating arm or finger 160 that is journaled by a headed pin 162 between the plate 126 and a supplemental bracket plate 164 mounted within the front casing 14.

Also mounted on the release handle shaft 124 is a holding pawl stop member 166 which is in the form of a sleeve portion 168 and a pawl engaging arm 170. The sleeve 168 is rotatably mounted on the release shaft 124 and is provided with a pair of spaced apart shoulders that are about 180 degrees apart that are not shown in the drawings but are clearly illustrated in said Pat. 3,390,590; as described in said Pat. 3,390,590, one of these shoulders is engaged by a shoulder of the shaft 124 to hold the pawl engaging stop member 166 in engagement with the pawl 150 in the brake holding position of the shaft 124 when the release handle 136 is in its brake holding position. The shaft 124 is also formed with a shoulder positioned to engage the other shoulder of sleeve 168 to move the pawl engaging stop member 166 out of engagement with the pawl 150 as the release handle is moved to the upper position of FIG. 2.

As indicated, the brake release mechanism shown is essentially the same as that described in said Pat. No. 3,390,590. The parts associated with pawl 150 are so constructed that when the release handle 136 is in the lower position of FIG. 2, one of the aforementioned shoulders of release shaft 124 (shown at 178 in said Natschke and Macku patent) will engage a corresponding shoulder (shown at 172 in said Natschke and Macku patent) of the sleeve 168 thereby holding the pawl stop arm 170 in the position shown in FIG. 2 against the pawl, which will thus be held against partial rotation. In such position, the ratchet wheel 96 is held from rotating in the direction that will release the brake (that is, a counterclockwise direction in the showing of FIG. 2). But when the ratchet wheel is moved through the hand wheel 68 and the intervening clutch device in the direction that is clockwise of FIG. 2, the inclined surfaces 190 of the ratchet wheel teeth 154 will engage the inclined end surface 192 of pawl 150, thereby causing the pawl to slide upwardly lengthwise of its axis until the tooth involved is past the pawl 150, whereupon the pawl 150 will drop by gravity into the space between the next adjacent teeth for abutting engagement with the next toothed surface 189.

In the specific hand brake arrangement of this application, the brake drum 30 comprises (see FIG. 1) a drum hub portion 200 defining reduced diameter end portions 202 and 204 which are respectively journaled in brass bushings 206 and 208 that are in turn respectively mounted in the respective dished bearing retainers 210 and 212 that are received in the respective openings 214 and 216 of the back plate and front casing respectively.

The drum hub portion is formed to define a flange 218 having teeth 220 formed therein to form the drum gear 34.

The drum hub portion is radially enlarged as at 226 to define a cylindrical rim portion 228 on which is fixed a ring member 230, as by welding, which is spaced from the flange 218 to define a chain link receiving recess 232. The flange 218 is shouldered as at 234, with the shoulder 234 and the periphery of ring 230 defining annular chain link supporting surfaces 236 and 238, respectively. Received between the flange 218 and ring 230 (the latter forming a second flange on the drum hub portion 200) is a rivet 239 of the countersunk head type for attaching the first link 241 of the brake chain 49 to the brake drum. Ring 230 and shoulder 234 are recessed as at 237 to accommodate the second chain link 243 so that it will lie flat on the drum. This permits the first chain link 241 to be of standard link size.

As indicated in FIG. 1, the flange 218 has its teeth 220 meshing with the gear cluster 65 and is formed to define a conical recess 240 which extends substantially underneath the shoulder 234 radially of the drum hub portion 200. The drum hub portion is recessed as at 242 to journal on same stop arm 244 which comprises a one piece element including a collar portion 246 and a radially extending arm 248 that extends radially of the drum hub portion 200 sufficiently to be engaged by a lug portion, boss, or protuberance 250 defined by the drum flange 218 adjacent rivet 239. In the form shown, lug portion or boss 250 comprises the land 251 formed in recess 240 to support rivet 239 and, as indicated in FIG. 2, lug portion or boss 250 is formed with a flattened striking surface 253 to insure adequate area of contact with arm 248.

Fixed to the inside surface 252 of back plate 16 is a stop block 254 which comprises a block of metal fixed to the back plate in the position indicated in FIGS. 1 and 2, as by welding.

As indicated in FIG. 1, the arm 248 of arm stop structure 244 is dimensioned axially of the brake drum 30 so that it will be engaged by the lug portion 250 of drum flange 218, and so it will engage the stop block 254 when moved in the direction of the stop block 254. While the specific shape of block 254 is largely a matter of choice so long as a sufficient area of engagement between the stop block and the back plate is provided to achieve the objects of the invention, block 254 is preferably provided with a generally planar striking face 260 that is engaged by the corresponding shaped side 262 of arm 248. Land 251 extends axially short of the plane of block 254 (see FIG. 1), however, so that drum 30 may be rotated a full 360 degrees (actually 390 degrees) in the winding and unwinding of the chain 49.

The gear cluster 65 comprises a forged shaft member 272 (see FIG. 1) defining a flange portion 274 provided with an integral gear 276 at its rim for meshing with the pinion 62 of operating shaft 66. Shaft member 272 is formed to define pinion 278 that meshes with the drum gear 34.

The shaft member 272 is formed to define reduced end portions 280 and 282 that are respectively journaled in brass bushings 284 and 286 that are respectively mounted in suitable dished retainers 288 and 290 received in the respective openings 292 and 294 of the housing back plate and front casing respectively. As indicated in FIG. 2, the shaft member 272 of the gear cluster 65 is journaled for rotation about an axis that lies in a plane which includes the axes of rotation of the operating shaft 66 and the brake drum 30 (see FIG. 2).

In operation, assuming that the hand brake 10 is released, the normal inoperative position of the release handle 136 will be the lower position of FIG. 2, which brings the teeth of clutch sleeve 108 into engagement with the tooth receiving recesses 212 of nut 102, and biases pawl 150 toward the ratchet wheel 96. Rotation of the hand wheel 68 in the direction to wind up the brake (clockwise of FIG. 2) will turn the nut 102 towards the clutch collar 92 of the pinion and bind the ratchet wheel 96, the pinion 62, and the operating shaft 66 into one rotating unit which will rotate the drum 30 in the direction to wind up the brake (clockwise of FIG. 2). During this operation, the pawl 150 moves back and forth under the action of teeth 154 and gravity until the brake is set. The release handle remains in its lower position so that when the brake is wound up and the pawl 150 is returned to its full line position of FIG. 2, the brake 10 is fully set.

Rotation of the operating shaft rotates the gear cluster 65 due to the meshing of the pinion 62 with its gear 276, and the gear cluster 65 in turn rotates the drum clockwise of FIG. 2 to wind up the brake chain 49 on the drum. The brake chain 49 in winding on the drum 30 winds up in the plane of recess 232, and thus the drum is of the single wind type. Alternate chain links of the chain 49, such as the chain link 241 shown in FIGURE 2, lie within the recess 232, while the other alternating link 243 sequentially are engaged by the two annular surfaces 236 and 238 until such surfaces are covered, the succeeding chain links then winding up on the first turn of links. The gear cluster 65 is proportioned in relation to the pinion 62 and drum gear 34 to insure that at least an average of about 6250 pounds of force (6800 pounds in a commercial embodiment) are applied to chain 49 after the first four inches of chain winding (the first four inches being to take up the slack in the chain and bring the brake chain up to pressure). Drum 30 is proportioned to provide 26 inches of chain winding on same in approximately 390 degrees of motion from the unwound position of FIG. 2. The first four inches of chain wind is taken by about 60 to 70 degrees of rotational movement of the brake drum in the chain winding direction, and approximately one and one-half inches of chain winding is accomplished beyond the 360 degree position from that of FIG. 2 in the chain winding direction, with about 30 degrees additional rotation in said direction.

If it is desired to gradually release the brake, the handwheel 68 is rotated in a counterclockwise direction a slight amount, which will have the effect of loosening the nut 102 and thus the clutching surfaces between the ratchet wheel and pinion 62 so that the pinion 62 and shaft 66 will rotate with respect to the ratchet wheel under the control of the operator, who by a slight loosening or tightening movement can increase or decrease the frictional drag on the rotational movement of the pinion 62, thus fully controlling brake release.

When it is desired to provide a free release of the brakes, the release handle 136 is moved from the lower position of FIG. 2 to the upper position of the same figure, which withdraws the teeth 110 of the jaw clutch 118 from the recesses 112 of nut 102 and moves the pawl engaging arm 170 out of contact with the pawl so that the ratchet wheel pinion and drum rotate freely to release the brakes. As soon as the handle 136 is released, it automatically returns by gravity to its lower position of FIG. 2 since it cannot be raised beyond such vertical position. It is preferred that the amount of movement between the horizontal position of FIG. 2 and the upper position of the same figure, of the handle 136, be on the order of 84 degrees, and a suitable stop pin of the type described in said Natschke and Macku patent (shown at 195 in that patent) in the path of movement of the cam member 122 provides for the released position of the handle 136.

As the brake drum moves in its chain unwinding direction, the lug portion 250 of drum flange 218 moves about the axis of the drum, and as the drum unwinding approaches the zero wind position, the lug portion 250 egages stop arm 248, which in turn is moved towards stop block 254. The momentum that the brake drum has achieved at the end of the chain unwinding continues to rotate the drum to bring the stop arm into full engagement with surface 260 of the stop block 254 and preclude further rotation of the drum in the chain unwinding direction, which thus limits further overtravel of the drum and rewinding of the brake chain on the drum in the wrong direction.

The brake chain stop of this invention provides the important advantage that the operator of the hand brake 10 cannot wind the brake chain up the wrong direction, as attempts to turn the handwheel 68 in the direction which will rotate the brake drum counterclockwise of FIG. 2 will bring the stop arm 248 firmly up against the stop block 254 under the urging of the drum lug portion 250.

Referring now to the embodiment of FIG. 3, the hand brake 300 there illustrated comprises a housing 11A and a brake operating mechanism 12A that are substantially identical to the housing 11 and brake operating mechanism of FIGS. 1 and 2 (including its brake drum 30, gear cluster 65, and associated parts), as indicated by identical reference numerals indicating identical parts.

However, the brake 300 is arranged for under the car application in the manner described by Andonian Patent 3,444,756, in accordance with which, the housing 11A is turned on its side and secured to the car underframe intermediate the sides of the car and between a pair of mounting plates (not shown but shown at 246 and 272 in said Andonian patent) that are respectively secured to the car sides, with the housing 11A extending longitudinally of the car. Journaled in the respective mounting plates are extensions for the hand brake operating and release shafts 66A and 124A that are each provided with operating handles exteriorly of the mounting plates in position relative to the car wheels so that the hand brake may be readily operated from either side of the car by the brakeman standing at the ground level. The hand brake parts are oriented so that gravity aids the holding of the hand brake mechanism against release.

As specifically illustrated in FIG. 3, the extensions for the hand brake operating release shaft 66A are in the form of shafts 17 and 19 that are described in said Andonian patent, with the extensions for the release shaft 124A comprising shafts 25 and 27 that are shown in said Andonian patent. In the case of the operating shafts 66A, in the embodiment of FIG. 3 it is provided at one of its ends with an extension 310 that is keyed to a coupling member 312 by a suitable pin 314, which coupling member 312 is secured to shaft 17, as by welding.

At its other end, the shaft 66A includes extension 316 which extends through the cup 80 and receives coupling member 318 to which it is keyed by a suitable pin 320. Shaft 19 is fixed to coupling member 318 as by welding.

In the case of release shaft 124A, the release handle 136 is eliminated, and in its place the release shaft 124A is extended as at 322 for reception in a coupling member 324 to which it is keyed by a suitable pin 326. Coupling member 324 is fixed to shaft 25 as by welding.

At its other end, the release shaft 124 is extended as at 328 for reception in coupling member 330 to which it is keyed by a suitable pin 332. Coupling member 330 is fixed to shaft 27 as by welding.

The hub member 133 of the release member 136 is replaced by a corresponding hub member 133A that is affixed to the shaft 124 in any suitable manner, as by employing pin 334.

The hand brake 300 operates in the manner similar to hand brake 10 except that the hand wheels 21 and 23 and handles 29 and 31 described in said Andonian patent are manipulated to control the hand brake.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a hand brake for railroad cars in which the hand brake includes a housing adapted to be mounted on a car, an operating shaft and a winding drum journaled in said housing, a brake chain having one end thereof connected to the winding drum for winding up on the drum when the drum is rotated in its chain winding direction, gear means coupling said operating shaft to said winding drum to wind up the chain on the drum and releasable ratchet means operably associated with said operating shaft to releasably hold same against rotation under the tension in the brake chain tending to rotate the drum in its chain unwinding direction when the chain is wound on the winding drum, a chain stop arrangement therefor comprising:
a stop arm pendantly carried by the drum,
said drum including lug means positioned and proportioned to engage said stop arm, when the chain is unwound from the drum after release of the ratchet means, and move same in the chain unwinding direction,
and stop means fixedly carried by said housing and disposed in the path of movement of said arm when moved by said lug means in said unwinding direction and positioned to stop movement of said arm and the drum to limit unwinding overtravel of the drum in the unwinding direction.

2. In a hand brake for railroad cars in which the hand brake includes a housing adapted to be mounted on a car, an operating shaft and a winding drum journaled in said housing, a brake chain having one end thereof carried by a chain anchor to the winding drum for winding up on the drum when the drum is rotated in its chain winding direction, gear means coupling said operating shaft to said winding drum to wind up the chain on the drum and releasable ratchet means operably associated with said operating shaft to releasably hold same against rotation under the tension in the brake chain tending to rotate the drum in its chain unwinding direction when the chain is wound on the winding drum, a chain stop arrangement therefor comprising:
a stop arm pendantly carried by the drum,
said drum including lug means adjacent the chain anchor and proportioned to engage said stop arm when the chain is unwound from the drum on release of the ratchet means to move said arm in the chain unwinding direction,
and a stop block fixedly carried by the housing and positioned in the path of movement of said arm when moved by said lug means in said unwinding direction and disposed to be engaged by said arm to stop unwinding overtravel of the drum.

3. In a hand brake for railroad cars in which the hand brake includes a housing adapted to be mounted on a car, an operating shaft and a winding drum journaled in said housing, a brake chain having one end thereof connected by a chain anchor to the winding drum for winding up on the drum when the drum is rotated in its chain winding direction, gear means coupling said operating shaft to said winding drum to wind up the chain on the drum and releasable ratchet means operably associated with said operating shaft to releasably hold same against rotation under the tension in the brake chain tending to rotate the drum in its chain unwinding direction when the chain is wound on the winding drum, whereby the chain one end extends rectilinearly from the drum with the chain anchor positioned in aligned relation between same and the axis of the drum in the unwound position of the chain, and the chain anchor is rotated in the chain winding direction by the drum in operation of the operating shaft to rotate the drum in the chain winding directions to wind the chain up on the drum, the improvement wherein:
a stop arm is journaled in said housing for swinging movement about the axis of the drum,
said drum including lug means adjacent the chain anchor for engaging said stop arm when the chain anchor approaches said aligned relation when the drum moves in the unwinding direction when the ratchet means is released to unwind the chain,
and a stop block carried by the housing and positioned to be engaged by said arm when moved by said lug means and stop unwinding overtravel of said chain anchor a predetermined amount beyond said aligned relation.
said stop block being positioned out of the path of movement of said drum lug means,
and said stop arm being proportioned axially of said drum to span the gap between said stop block and said lug means axially of said drum.

4. The improvement set forth in claim 3 wherein:
said winding drum comprises:
a hub portion journaled in the housing and defining two generally radial flanges,
with the chain anchor comprising pin means extending between said flanges and parallel to said axis of said drum,
and with the end link of the chain received over said pin and between said flanges,
said flanges being spaced to support alternate chain links on their rims when the chain is wound on the drum,
said stop arm being journaled on said drum hub portion,
and said drum lug means being spaced from said stop block axially of said drum 5. The improvement set forth in claim 4 wherein: one of said drum flanges includes a radial extension toothed for gear type coupling relation with the operating shaft.

6. The improvement set forth in claim 5 wherein:
said radial extension of said one drum flange is recessed axially of the drum axis and houses said stop arm,
said one drum flange being formed to define said lug means.

7. The improvement set forth in claim 4 wherein:
said chain has about 26 inches of chain wind with a rotation of about 390 degrees in the chain winding direction,
said drum being of the single wind type.

8. The improvement set forth in claim 3 wherein:
the gear means comprises:
a pinion and means for releasably keying same to the operating shaft,
and an intermediate gear cluster unit interposed between said pinion and the teeth of said one drum flange extension,
said gear cluster unit comprising:
a one-piece forged member including:
a pinion in meshing relation with the teeth of said one drum flange extension,
and a gear in meshing relation with the first mentioned pinion,
and means for journaling said forged member in said housing.

9. The improvement set forth in claim 8 wherein said means for journaling said forged member in said housing comprises cup shaped supports at each end of said forged member that are carried by said housing.

References Cited

UNITED STATES PATENTS

| | | | |
|---|---|---|---|
| 2,000,078 | 5/1935 | Haseltine | 74—505 UX |
| 2,733,790 | 2/1956 | Dyke | 74—505 X |

MILTON KAUFMAN, Primary Examiner